United States Patent
Somasundaram et al.

(10) Patent No.: US 8,693,479 B2
(45) Date of Patent: Apr. 8, 2014

(54) RADIO LINK CONTROL RESET USING RADIO RESOURCE CONTROL SIGNALING

(75) Inventors: Shankar Somasundaram, Mountain View, CA (US); Rajat P. Mukherjee, San Francisco, CA (US); Mohammed Sammour, Alrabieh Amman (JO); Stephen E. Terry, Northport, NY (US); Jin Wang, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 34 days.

(21) Appl. No.: 13/293,528

(22) Filed: Nov. 10, 2011

(65) Prior Publication Data

US 2012/0093110 A1    Apr. 19, 2012

Related U.S. Application Data

(62) Division of application No. 12/346,443, filed on Dec. 30, 2008, now abandoned.

(60) Provisional application No. 61/019,049, filed on Jan. 4, 2008.

(51) Int. Cl.
*H04L 12/28* (2006.01)
*H04L 12/56* (2011.01)
*H04J 3/16* (2006.01)
*H04J 3/22* (2006.01)
*H04J 3/24* (2006.01)

(52) U.S. Cl.
USPC ............................ 370/394; 370/469; 370/474

(58) Field of Classification Search
USPC .......................................... 370/394, 469, 474
See application file for complete search history.

(56) References Cited

U.S. PATENT DOCUMENTS 6,904,016 B2    6/2005  Kuo et al.
7,835,398 B2 *  11/2010 Denney et al. ................ 370/474
(Continued)

FOREIGN PATENT DOCUMENTS

EP    1 408 658    4/2004
EP    1 465 369   10/2004
(Continued)

OTHER PUBLICATIONS

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V1.0.0 (Nov. 2007).

(Continued)

*Primary Examiner* — Farah Faroul
(74) *Attorney, Agent, or Firm* — Volpe and Koenig, P.C.

(57) ABSTRACT

A method and apparatus are described for implementing a reset procedure for radio link control (RLC) using radio resource control (RRC) signaling. A wireless transmit/receive unit (WTRU) receives a request for RLC reset. A processor at the WTRU comprises a RRC entity and a RLC entity. The RRC entity receives the request for a RLC reset in a radio resource control message. The RLC entity reassembles RLC service data units (SDUs) from any protocol data units (PDUs) that are received out of sequence at a receiving side of the RLC entity. The reassembled SDUs are delivered in sequence to a packet data convergence protocol entity (PDCP). At the receiving side of the RLC entity, any remaining PDUs that are not able to be reassembled are discarded. At a transmitting side of the RLC entity, all SDUs and PDUs stored in transmit buffers are discarded.

7 Claims, 3 Drawing Sheets

(56) References Cited

U.S. PATENT DOCUMENTS

| | | | |
|---|---|---|---|
| 8,130,723 B2* | 3/2012 | Tseng | 370/331 |
| 8,270,369 B1* | 9/2012 | Chang | 370/331 |
| 2003/0092458 A1 | 5/2003 | Kuo | |
| 2003/0157927 A1 | 8/2003 | Yi et al. | |
| 2003/0206534 A1 | 11/2003 | Wu | |
| 2003/0210714 A1 | 11/2003 | Wu | |
| 2004/0203623 A1 | 10/2004 | Wu | |
| 2004/0208160 A1 | 10/2004 | Petrovic et al. | |
| 2005/0054298 A1 | 3/2005 | Chen | |
| 2006/0234706 A1 | 10/2006 | Wallentin | |
| 2008/0095116 A1 | 4/2008 | Kim et al. | |
| 2008/0123655 A1 | 5/2008 | Kim et al. | |
| 2008/0148136 A1* | 6/2008 | Bae et al. | 714/799 |
| 2008/0188224 A1* | 8/2008 | Pani et al. | 455/436 |
| 2008/0209297 A1* | 8/2008 | Chandra et al. | 714/748 |
| 2008/0225817 A1 | 9/2008 | Moon et al. | |
| 2008/0279218 A1* | 11/2008 | Jiang | 370/470 |
| 2009/0190554 A1* | 7/2009 | Cho | 370/331 |
| 2009/0264127 A1 | 10/2009 | Chun et al. | |
| 2010/0195519 A1* | 8/2010 | Ji | 370/252 |
| 2010/0232376 A1* | 9/2010 | Wu | 370/329 |
| 2012/0082096 A1* | 4/2012 | Cave et al. | 370/328 |
| 2012/0147835 A1* | 6/2012 | Pani et al. | 370/329 |

FOREIGN PATENT DOCUMENTS

| | | |
|---|---|---|
| EP | 1 708 413 | 11/2006 |
| EP | 1 868 311 | 12/2007 |
| WO | 2005/122441 | 12/2005 |

OTHER PUBLICATIONS

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.0.0 (Dec. 2007).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.3.0 (Sep. 2008).

Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.0.0 (Mar. 2007).

Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.3.0 (Dec. 2007).

Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.6.0 (Sep. 2008).

Third Generation Partnership Project, "Technical Specification Group Radio Access Network; Evolved Universal Terrestrial Radio Access (E-UTRA); Packet Data Convergence Protocol (PDCP) Specification (Release 8)", 3GPP TS 36.323, V8.0.0 (Dec. 2007).

Third Generation Partnership Project, "Technical Specification Group Radio Access Network; Evolved Universal Terrestrial Radio Access (E-UTRA); Packet Data Convergence Protocol (PDCP) Specification (Release 8)", 3GPP TS 36.323, V8.3.0 (Sep. 2008).

Third Generation Partnership Project, "Technical Specification Group Radio Access Network; Radio Link Control (RLC) Protocol Specification (Release 6)," 3GPP TS 25.322, V6.10.0 (Jun. 2007).

Third Generation Partnership Project, "Technical Specification Group Radio Access Network; Radio Link Control (RLC) Protocol Specification (Release 6)," 3GPP TS 25.322, V6.12.0 (May 2008).

Third Generation Partnership Project, "Technical Specification Group Radio Access Network; Radio Link Control (RLC) Protocol Specification (Release 7)," 3GPP TS 25.322, V7.4.0 (Sep. 2007).

Third Generation Partnership Project, "Technical Specification Group Radio Access Network; Radio Link Control (RLC) Protocol Specification (Release 7)," 3GPP TS 25.322, V7.8.0 (Sep. 2008).

Third Generation Partnership Project, "Technical Specification Group Radio Access Network; Radio Link Control (RLC) Protocol Specification (Release 8)," 3GPP TS 25.322, V8.2.0 (May 2008).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V2.0.0, (Nov. 2007).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.0.0, (Dec. 2007).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.3.0, (Sep. 2008).

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.0.0, (Dec. 2007).

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.3.0, (Sep. 2008).

Third Generation Partnership Project, "Technical Specification Group Radio Access Network; Radio Link Control (RLC) protocol specification (Release 8)," 3GPP TS 25.322 V8.0.0 (Dec. 2007).

* cited by examiner

# RADIO LINK CONTROL RESET USING RADIO RESOURCE CONTROL SIGNALING

CROSS REFERENCE TO RELATED APPLICATIONS

This application is a divisional of U.S. non-provisional application Ser. No. 12/346,443 filed on Dec. 30, 2008, which claims the benefit of U.S. Provisional Application No. 61/019,049 filed on Jan. 4, 2008, which is incorporated by reference as if fully set forth herein.

FIELD OF INVENTION

This application is related to wireless communications.

BACKGROUND

Current efforts for the $3^{rd}$ Generation Partnership Project (3GPP) Long Term Evolution (LTE) and LTE-Advanced wireless communication programs are to bring new technology, new architecture and new methods in the new LTE settings and configurations in order to provide improved spectral efficiency and reduced latency. As a result, the radio resources would be better utilized to bring faster user experiences and richer applications and services with less cost.

As part of this effort, 3GPP is defining new procedures for the Radio Resource Control (RRC) and Radio Link Control (RLC) layers to help meet these goals. In the prior art (e.g., Universal Mobile Telecommunication System (UMTS) specifications), an RLC entity of a transmitter did not request a reset after reaching a maximum allowed number of RLC retransmissions. Instead, the RLC entity would attempt to keep the call alive and initiate its own reset without the RRC being aware. To do so, the RLC entity would continue retransmissions and then continue with the reset procedure until the RLC was able to recover or until the maximum number of retransmission for RLC reset was reached. When the RLC failed, the RRC would initiate a radio link failure (RLF) recovery procedure, but would put the transmitter into IDLE mode rather than attempting a RRC connection re-establishment.

Current LTE proposals allow a RLC entity to reset using RLC control protocol data units (PDUs). However, this procedure can be complex. Accordingly, there exists a need for an improved method and apparatus for resetting the RLC entity.

SUMMARY

A method and apparatus are described wherein a reset procedure for a radio link control (RLC) is implemented by radio resource control (RRC) signaling. Triggers for the initiation and execution of the reset procedure are also described.

A wireless transmit/receive unit (WTRU) may be configured to reset a base station radio link control (RLC) entity. An RLC entity in the WTRU may be configured to detect that a number of retransmissions has reached a maximum number of allowed retransmissions, and trigger a radio link failure. A radio resource control (RRC) entity in the WTRU may be configured to send an RRC message indicating an RLC reset to a base station in response to the radio link failure indication. The RRC message may include an information element identifying a radio link entity requesting the RLC reset, a radio link entity to be reset, a reset sequence number, a cause for the RLC reset, or configuration parameters for the RLC reset.

Alternatively, a wireless transmit/receive unit (WTRU) receives a request for radio link control reset. A processor at the WTRU comprises a radio resource control (RRC) entity and a radio link control (RLC) entity. The RRC entity receives the request for a radio link control reset in a radio resource control message. The RLC entity reassembles radio link control service data units (SDUs) from any protocol data units (PDUs) that are received out of sequence at a receiving side of the RLC entity. The reassembled SDUs are delivered in sequence to a packet data convergence protocol entity. At the receiving side of the RLC entity, any remaining PDUs that are not able to be reassembled are discarded. At a transmitting side of the RLC entity, all SDUs and PDUs stored in transmit buffers are discarded.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B, a site controller, an access point (AP), or any other type of interfacing device capable of operating in a wireless environment.

It should be noted that the disclosed RLC 'Reset' procedure may be referred to by other names such as RLC 'Re-establishment' or RLC 'Re-configuration'. As such, the disclosed method and apparatus applies even when the procedures proposed herein are described using other names or terms in the 3GPP standards specifications.

Figure 1:
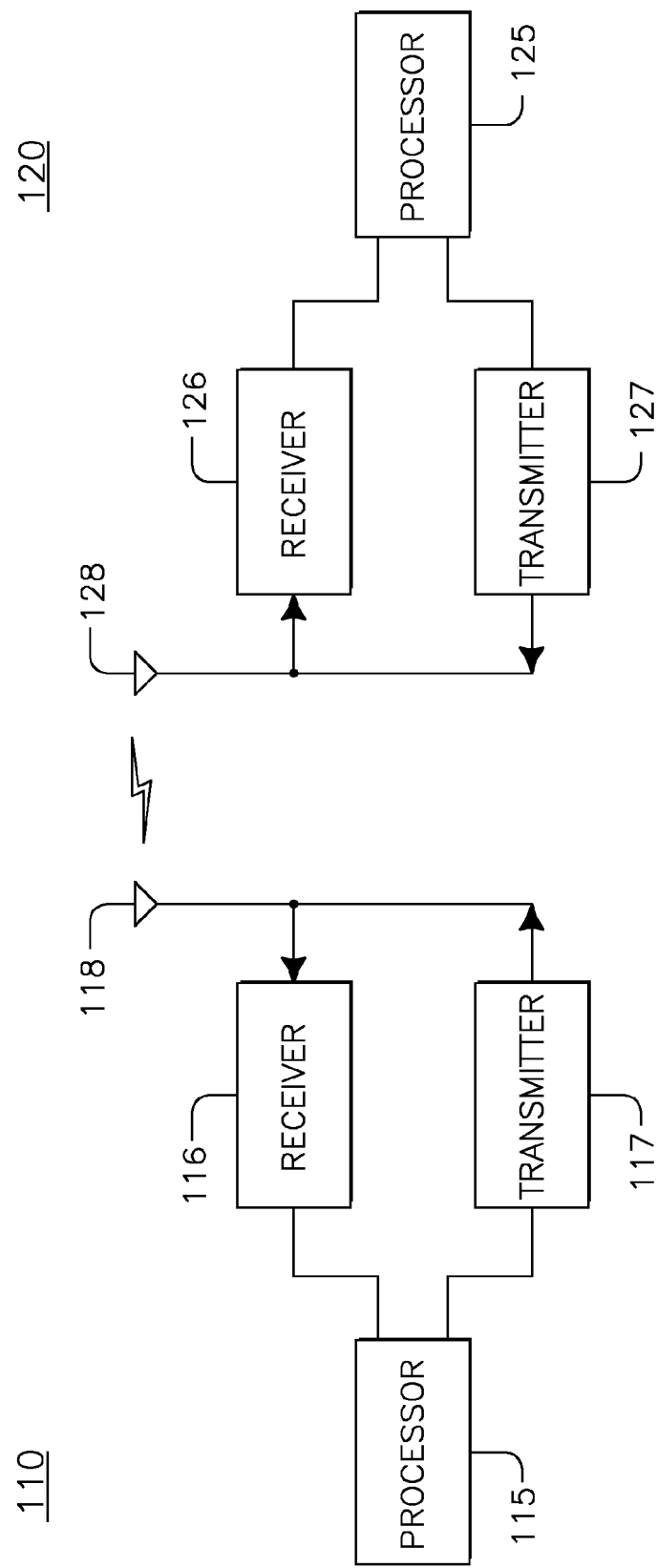
FIG. 1 is a functional block diagram of a transmitter and receiver configured to perform a RLC reset.

FIG. 1 is a functional block diagram of a transmitter and receiver 110, 120 configured to perform the disclosed method. In addition to components included in a typical transmitter/receiver (i.e., a WTRU or base station), the transmitter 110 and the receiver 120 includes: processors 115, 125 configured to perform a reset of an RLC entity using RRC signaling; receivers 116, 126 in communication with processors 115, 125; transmitters 117, 127 in communication with processors 115, 125; and antennas 118, 128 in communication with receivers 116, 126 and transmitters 117, 127 to facilitate the transmission and reception of wireless data. Additionally, the receiver 116, the transmitter 117 and the antenna 118 may be a single receiver, transmitter and antenna, or may include a plurality of individual receivers, transmitters and antennas, respectively. The transmitter 110 may be a WTRU transmitting to a base station receiver 120. Alternatively, the transmitter 110 may be a base station transmitting to a WTRU receiver 120.

Figure 2:
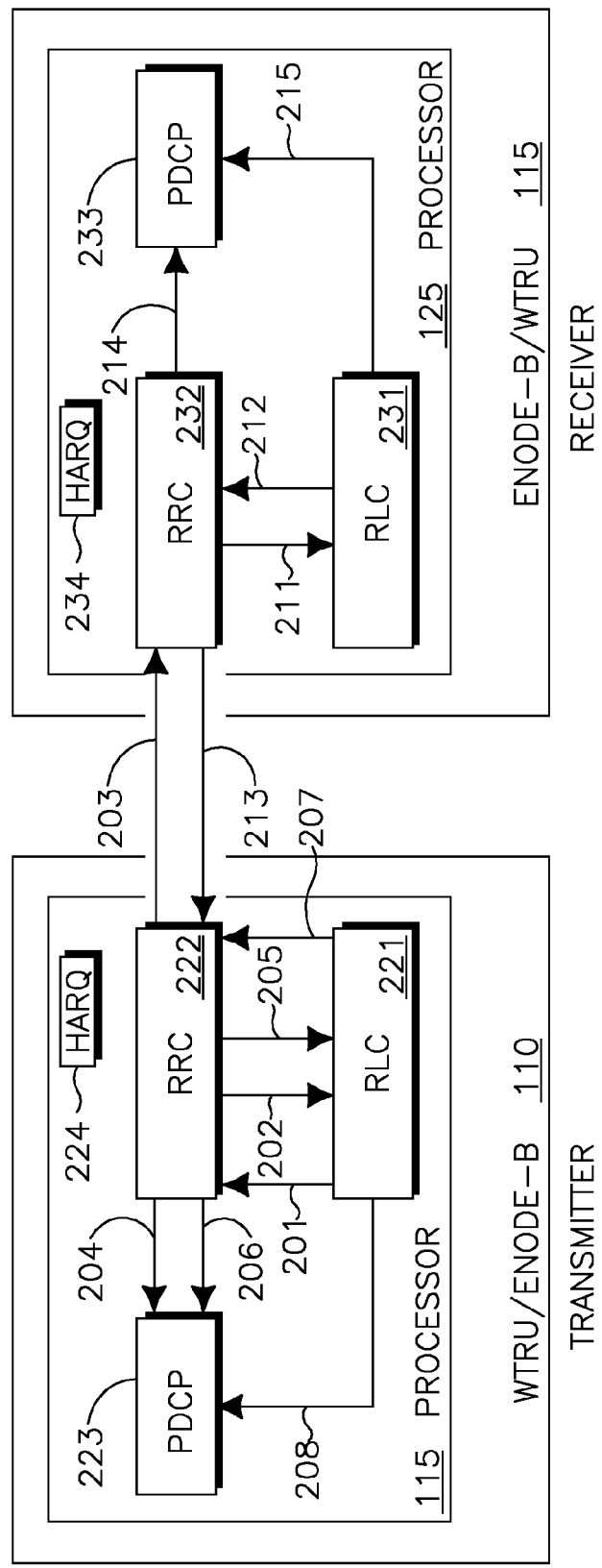
FIG. 2 is a functional block diagram of a transmitter processor and a receiver processor configured to perform a RLC reset.

FIG. 2 shows a signaling diagram for the transmitter 110 and the receiver 120, in which the processor 115 comprises a radio link control layer (RLC) entity 221, a radio resource control layer (RRC) entity 222, a packet data convergence protocol layer (PDCP) entity 223, and the processor 125 comprises an RLC entity 231, a RRC entity 232, and a PDCP entity 233. While a single RLC entity 221 is shown for the processor 115, and a single RLC entity 231 is shown for the processor 125, there may be multiple RLC entities, including a transmitting Unacknowledged Mode (UM) RLC entity, a receiving UM RLC entity, a transmitting Transparent Mode (TM) RLC entity, a receiving TM RLC entity, and an Acknowledged Mode (AM) RLC entity. A single RLC entity 221, 231 is shown for purpose of simplifying the description herein and is not meant to represent a limitation to the disclosed method and apparatus. It should be noted that the inter-layer entity activity disclosed below for the Radio Resource Control (RRC) and RLC may be accomplished by defining new primitives or information elements between the layers.

Upon detecting an RLC Reset trigger as an indication of RLC failure, the RLC entity 221 included in transmitter processor 115 sends a RLC reset request indication 201 to the RRC entity 222 indicating that a RLC Reset is desired (i.e., that both the peer RLC entity 231 and the RLC entity 221 itself should be reset). An example of an RLC Reset trigger may be, for an AM RLC entity 221, that the maximum number of retransmissions allowed has been reached. Other examples of triggers include a Service Data Unit (SDU) discard not being configured for an event, RLC Status PDUs indicating erroneous sequence numbers; unrecoverable errors; and any other event or trigger that requires the RLC to be reset.

The RLC Reset request indication 201 that is forwarded to the RRC entity 222 may include one or more of the following types of request information in the form of an information element (IE) or a single or multiple bit value. A cause value may be included to indicate the reason for the RLC Reset request indication 201. For example, if the trigger is the maximum number of retransmissions being reached, the RLC reset request indication 201 includes an indication of this to the RRC entity 222. Status information may also be included in the RLC Reset request indication 201 indicating the last sequence number (SN) correctly received for the RLC entity 221 requesting the RLC Reset. The RLC Reset request indication 201 may also include an identification of the RLC entity 221 to be reset (e.g., the RLC entity identification may be according to the logical channel instance associated with the RLC entity or the radio bearer associated with the RLC entity), or alternatively, a new RLC entity ID may be defined and indicated for explicitly identifying the RLC entity.

After forwarding the RLC request indication 201 to the RRC entity 222, the RLC entity 221 may perform one or more of the following:
1. Start a timer T101 that may be specific to each RLC entity 221 or common to each RLC entity 221.
2. Suspend transmission of any protocol data units (PDUs) on the RLC entity 221 being reset.
3. Flush the buffer of any SDUs sent before the RLC reset.
4. Suspend reception of any PDUs on the RLC entity 221, which may occur via discarding any received PDUs for such entity.
5. Increment/Decrement a counter C101 that keeps a count of the number of reset requests. This counter may be specific to each RLC entity.
6. Reset the RLC entity 221 to initially configured parameters (e.g., the sequence number (SN) may be reset back to zero). Alternatively, the RLC entity 221 may take this reset action on the expiration of the timer T101.
7. Wait for an indication 202 from the RRC entity 222 before starting any of the above procedures. The indication 202 from the RRC entity 222 may take the form of an acknowledgment of the reset request indication 201 and/or confirmation of the reset procedures being initiated by the RRC entity 222.

The RRC entity 222, upon receiving an RLC reset indication 201 that an RLC reset is required, may send an RRC message 203 to the peer RRC entity 232 indicating a reset of RLC is required. The parameters for the RLC reset may be included in any RRC message 203 (e.g., a RRC CONNECTION RE-ESTABLISHMENT message or a RRC CONNECTION RECONFIGURATION message) or in a new RRC message dedicated for reset procedures, such as a PROTOCOL RESET message as will be described further below. In order to transmit the RLC Reset request information, a new IE, such as an RLC Reset IE or a Protocol Reset Indicator Information Element (IE), may be used for indicating the reset request of the RLC entity 221. This IE may be carried in any RRC message 203 or in a specific message dedicated for reset procedures. An example of the RLC Reset IE parameters is presented in Table 1 below.

TABLE 1

| Information | Multi | Type and Reference | Semantics |
|---|---|---|---|
| Information for protocol entity for reset | <1 to Number of entities requesting Reset> | | |
| >Protocol entity requesting reset | | Boolean | Identifies whether the entity being reset is a PDCP entity or an RLC entity. This may not be necessary if the reset indicator IE is defined specifically for RLC or PDCP. |
| >>Identity | | Integer | Identification of the RLC entity being reset. This may be either the logical channel instance mapped to the RLC entity, or the RB ID mapped to the entity or some other ID. This information may be implied by the presence of some other information in a parent field in the information tree. |
| >>>RSN | | Integer | The Reset sequence number (RSN) identifies if this is the first reset request for this entity or a retransmission. Alternatively, the RSN may be defined for the entire RRC message instead of on a per-entity basis |
| >>>Cause | | Integer | Indicates the reason for reset request |
| >>>Reset configuration | | Boolean | Identifies if the RLC entity is to be reset to default/initial configurations or some different configuration If RLC entity is to be reset to a configuration different from initial/default. |
| >>>>Parameters for reset | | | |

The individual IEs described in TABLE 1 are optional and the information contained in them may be passed in a different manner. The RRC message 203 indicating the reset may be any indication of a reset. For example, the RRC message 203 may include, but is not limited to, a bit, or a few bits, that may be passed in any RRC message to more detailed IEs (e.g., see Protocol Reset Indicator IE) to dedicated messages. The indications in the RRC message 203 may be explicit or implicit and may also include RLC and/or PDCP status. For an implicit indication, a separately sent RRC message that does not contain the reset IEs may indicate that a reset is required merely by the RRC message name according to a prearranged definition.

The RRC message 203 indicating the RLC reset request to the peer RRC entity 232 may include an explicit or implicit indication of the time of the reset/activation of reset. Alternatively this may be accomplished on a Transmission Time Interval (TTI) or a System Frame Number (SFN) basis. As an example, a synchronization may be achieved by alignment of the RLC reset with the SFN or a number of TTIs relative to the last TTI in which the RRC message 203 was transmitted/received.

In the event that the RLC entity 221 to be reset is the same RLC entity that would initiate an RRC message 203 indicating the reset, the RRC entity 222 may transmit the message indicating the reset over a radio bearer (RB), which is mapped to a different RLC entity of transmitter 110. Alternatively, a new RB and associated RLC entity may be configured. Alternatively, the RRC message 203 containing the RLC reset IE can be transmitted on a Signaling RB (SRB). This SRB may be dedicated to the reset of RLC and some other purposes (e.g., a reset of PDCP). It is preferable that the SRB be mapped to a RLC UM entity to avoid the possibility of this SRB being reset.

The RRC entity 222 may ensure that the RRC message 203 for RLC Reset will fit inside a single RLC PDU. The RRC entity 222 may aggregate multiple reset requests from different RLC entities 221 into a single message 203. If the transmitting RRC entity 222 receives a reset request for a transmitting RLC entity 221 for which a reset procedure is ongoing it may ignore the request. The transmitting RRC entity 222 may acknowledge a reset request from the transmitting RLC layer/entity in an acknowledgment signal 202.

The transmitting RRC entity 222 may send a pending RLC Reset indication 204 to the PDCP entity 223. This may trigger the generation of a PDCP status PDU at the transmitter 110.

After transmission of the RRC message 203 indicating the RLC Reset request, the RRC entity 222 may perform one or more of the following:
1. Start a timer T102 timer that may determine the time the transmitting RRC entity 222 may wait for an RLC Reset acknowledgment 213 before initiating further action;
2. Increment/Decrement a counter C102 that keeps a count of the number of RLC reset requests via the RRC messages 203. This counter may be specific to each RLC entity 221 and may be used to indicate the RSN for the RLC Reset request. The RRC entity 222 may use a RRC Transaction Identifier to distinguish re-transmissions of the same reset request; and
3. Provide an indication 205 to the RLC entity 221 that the RLC Reset procedure has been initiated.

If the timer T102 described above expires, the RRC entity 222 may implement one of the following:
1. Retransmit the RLC Reset request in another RRC message 203;
2. Send a new RLC Reset request, with possibly a reference to a different RLC entity to be reset;
3. Increment/Decrement the counter C102 and restart the timer T102; and
4. Provide an indication of timer T102 expiration to the RLC entity 221.

If the counter C102 reaches a pre-determined value (e.g. a configured/pre-determined value for the maximum number of reset requests) the RRC entity 221 may initiate a different set of procedures. For example, the RRC entity 222 may initiate RRC RECONFIGURATION procedures or Radio Link Failure procedures or Physical Channel Reconfiguration procedures or some other recovery procedure.

The RRC entity 222 may use Hybrid Automatic Repeat Request (HARQ) assistance to retransmit the RRC message 203 that contains the reset indicator. For example, a HARQ entity 224 may indicate to the RRC entity 222 that delivery of the RRC PDU that contains the RLC reset has failed, and subsequently the RRC 222 retransmits the PDU.

At the receiver 115, upon receipt of the RRC message 203 with the RLC Reset request, the RRC entity 232 implements one or more of the following actions:
1. Send an RRC message acknowledgment 213 to acknowledge receipt of the reset request back to the transmitter RRC entity 222. The receiver RRC entity 232 may pass the RLC Reset request to the receiver RLC entity 231; alternatively, the acknowledgment 213 may be sent after waiting for a reset confirmation from the RLC entity 231;
2. Stop the transmission/reception of any PDUs on the RBs configured for the RLC entity 231;
3. Instruct the RLC entity 231 to flush the RLC data buffer; and
4. Pass the RLC Reset request to the RLC entity 231 as indication 211 and to the PDCP entity 233 as indication 214, along with any associated reset parameters.

In the event that the RLC entity 231 that is to be reset is the same RLC entity that is to initiate the RRC message 213 indicating the RLC Reset acknowledgment, the receiver RRC entity 222 may transmit the message indicating the reset acknowledgment over a RB which is mapped to a different RLC entity. Alternatively, a new RB and associated RLC entity may be configured.

In another alternative, the RRC message 213 comprising the RLC Reset acknowledgment IE can be transmitted on a Signaling RB (SRB). This SRB may be dedicated to the reset acknowledgment of RLC and some other purposes (e.g., reset acknowledgment of PDCP). This SRB may be mapped to a UM RLC entity to avoid the possibility of this SRB being reset.

The RRC entity 232 may ensure that the RRC message 213 for reset acknowledgment will fit inside a single RLC PDU. The RRC entity 232 may aggregate multiple reset acknowledgments for different RLC entities 231 into a single message.

The RRC procedure may use HARQ assistance to retransmit the RRC message that contains the reset acknowledgment indicator. For example, a HARQ entity 234 may indicate to the RRC 232 that delivery of the RRC PDU that contains the RLC reset acknowledgment has failed, and subsequently the RRC entity 232 retransmits the PDU.

The RRC entity 232, upon receiving an RLC reset indication 212 that an RLC reset has occurred, may send an RRC message 213 to the peer RRC entity 222 indicating acknowledgment of the RLC reset. The parameters for the RLC reset acknowledgment may be included in any RRC message 213 (e.g., a RRC CONNECTION REESTABLISHMENT COMPLETE message or a RRC CONNECTION RECONFIGURATION COMPLETE message) or in a new RRC message dedicated for reset procedures, such as a PROTOCOL RESET ACKNOWLEDGE message as will be described further below. In order to transmit the RLC Reset acknowledgment information, a new IE, such as an RLC Reset Acknowledgment IE or a Protocol Reset ACK IE, may be used for indicating the reset of the RLC entity 231. This IE may be carried in any RRC message 213 or in a specific message dedicated for RLC reset procedures. An example of the RLC Reset Acknowledgment IE parameters is presented in TABLE 2 below.

TABLE 2

| Information | Multi | Type and Reference | Semantics |
| --- | --- | --- | --- |
| Information for protocol entity reset being acknowledged | <1 to Number of entities for Reset being acked> | | |
| >Protocol entity for reset being acknowledged | | Boolean | Identifies whether the entity being reset acknowledged is a PDCP entity or an RLC entity. This may not be necessary if the reset acknowledge indicator IE is defined specifically for RLC or PDCP. |
| >>Identity | | Integer | Identification of the RLC entity being reset acknowledged. This may be either the logical channel instance mapped to the RLC entity, or the RB ID mapped to the entity or some other ID. This information may be implied by the presence of some other information in a parent field in the information tree. |
| >>>RSN | | Integer | The Reset SN identifies the corresponding reset request that is being acked. This shall be the same as the RSN in the corresponding reset request. |

It should be understood that the individual RLC Reset Acknowledge IE parameters described above are optional and the information contained in the IE may be passed in a different manner.

When the RLC entity 231 at the receiver receives a command from the RRC entity 232 to reset, the RLC entity 231 may implement one or more of the following:
 1. Reset some or all the RLC state variables for that entity to their initial/default values or to the value (if any) configured in the reset request;
 2. Reset configurable parameters to their configured values or to a new value (if any) received in the reset request;
 3. Stop and/or restart any or all timers associated with that RLC entity 231;
 4. In the receiving side of the RLC entity 231, if possible, reassemble RLC SDUs from the PDUs that are received out of sequence and deliver them to the upper layer entities (e.g., PDCP entity 233); discard any remaining PDUs that could not be reassembled into RLC SDUs;
 5. In the transmitting side of the RLC entity 231, discard all RLC PDUs from the PDU (re)transmit buffer of the RLC entity 231;
 6. In the transmitting side of the RLC entity 231, discard all RLC SDUs from the SDU transmit buffer of the RLC entity 231, and notify the upper layer entities (e.g., PDCP entity 233) of the discarded SDU(s). After receiving such notification, the upper layer (e.g., PDCP entity 233) may re-submit (i.e., effectively retransmit) those SDUs for transmission to the RLC entity 231 below it, following the completion of the RLC reset. In another alternative, in the transmitting side of the RLC entity 231, the RLC SDUs are not discarded from the SDU transmit buffer of the RLC entity 231 when reset occurs;
 7. In the transmitting side of the RLC entity 231, notify the upper layers (e.g., PDCP entity 233) of all SDUs whose reception have not been acknowledged (confirmed) by the peer RLC entity 221 (via RLC STATUS PDUs). After receiving such notification, the upper layer entity (e.g., PDCP entity 233) may re-submit (i.e., effectively retransmit) those SDUs for transmission to the RLC entity 231 below it, following the completion of the RLC reset;
 8. Confirm completion of the reset procedures to the RRC with indication 212; and
 9. Indicate the completion of reset to upper layer entities (e.g., PDCP entity 233 with indication 215).

The PDCP entity 233 may use an indication of the RLC reset (received via RRC indication 214 or RLC indication 215) to generate a PDCP Status PDU.

The RLC entity 231 reset may be synchronized with the RRC procedure (i.e., the RRC message 203 and/or message 213). The RRC procedure may include an explicit or implicit indication of the time of the reset/activation of reset. Alternatively this may be accomplished on a TTI or SFN basis. As an example, the synchronization between the RRC procedure and the RLC reset could also be aligned with the SFN or a number of TTI's relative to the last TTI in which the RRC message 203 and/or RRC message 213 was received.

Upon reception of the acknowledgment of the RLC reset via RRC message 213 from the receiver RRC entity 232, the transmitter RRC entity 222 implements one or more of the following:
 1. Stop timer T102;
 2. Reset the counter C102 to its initial value or zero; and
 3. Confirm the acknowledgment RRC message 213 to the RLC entity 221 with indication 205 and to the PDCP entity 223 with indication 206.

The RLC entity 221, upon receiving acknowledgment of the reset request via the RRC indication 205, implements one or more of the following:
 1. Stop timer T101;
 2. Reset counter C101 to zero;

3. Reset some or all the RLC state variables for that entity to their initial/default values or to the value (if any) configured in the reset request;
4. Reset configurable parameters to their configured values or to a new value (if any) received in the reset request;
5. Stop and/or restart any or all timers associated with that RLC entity 221;
6. In the receiving side of the RLC entity 221, if possible reassemble RLC SDUs from the PDUs that are received out of sequence and deliver them in sequence to the PDCP entity 223; discard any remaining PDUs that could not be reassembled into RLC SDUs;
7. In the transmitting side of the RLC entity 221, discard all RLC PDUs from the PDU (re)transmit buffer of the RLC entity 221;
8. In the transmitting side of the RLC entity 221, discard all RLC SDUs from the SDU transmit buffer of the RLC entity 221, and notify the upper layers (e.g., PDCP 223) of the discarded SDU(s). After receiving such notification, the upper layer (e.g., PDCP 223) may re-submit (i.e. effectively retransmit) those SDUs for transmission to the RLC entity 221 below it, following the completion of the RLC reset. In another less preferred alternative: In the transmitting side of the RLC entity, do not discard RLC SDUs from the SDU transmit buffer of the RLC entity 221 (when reset occurs);
9. In the transmitting side of the RLC entity 221, notify the upper layers (e.g., PDCP 223) of all SDUs whose reception have not been acknowledged (confirmed) by the peer RLC entity (via RLC STATUS PDUs). After receiving such notification, the upper layer (e.g., PDCP 223) may re-submit (i.e. effectively retransmit) those SDUs for transmission to the RLC entity 221 below it, following the completion of the RLC reset;
10. Confirm completion of the reset procedures to the RRC entity 222; and
11. Indicate the completion of reset to upper layers (e.g. PDCP 223).

The PDCP entity 223 may use the acknowledgment of the RLC reset (received via RRC indication 206 or RLC indication 208) to generate a PDCP Status PDU.

The RLC 221 reset may be synchronized with the RRC procedure (i.e., the RRC message 203 and/or message 213). The RRC procedure may include an explicit or implicit indication of the time of the reset/activation of reset. Alternatively this may be accomplished on a TTI or SFN basis. As an example the synchronization between the RRC procedure and the RLC 221 reset could also be aligned with the SFN or a number of TTI's relative to the last TTI in which the RRC message 203, and/or RRC message 213 was received.

Figure 3:
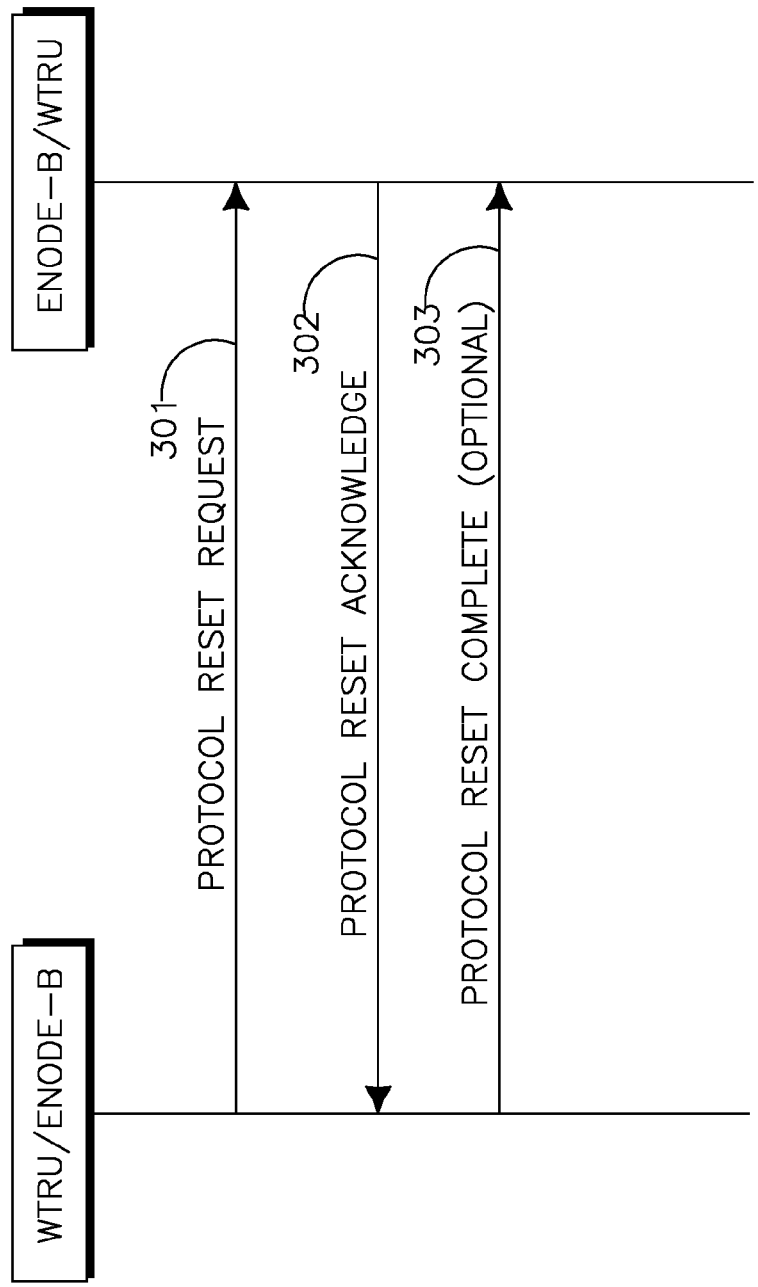
FIG. 3 is signal diagram for a Protocol Reset signal.

In accordance with the method disclosed above for RLC reset accomplished via RRC, the following is a summary of the RRC signaling for the RRC messages 203 and 213 in terms of a Protocol Reset procedure, shown in FIG. 3.

The transmitting RRC entity 222 may initiate this Protocol Reset procedure whenever the RLC entity 221 in the transmitter 110 indicates the need for resetting a RLC entity.

Upon initiation of the procedure the transmitting RRC entity 222:
1> Initiates transmission of a PROTOCOL RESET REQUEST message 301
1> Indicates initiation of the procedure to the RLC (optional)
1> Start Timer T102 when lower layers indicate successful transmission of the message Upon expiration of the timer T102 the transmitting RRC entity 222:
1> Re-Initiates transmission of the PROTOCOL RESET REQUEST message 301
1> Re-Starts Timer T102 when lower layers indicate successful transmission of the message The transmitting RRC entity 222 takes the following actions when it initiates the transmission of a PROTOCOL RESET REQUEST message 301:
1> if this is a new reset request
2> Initialize a new instance of the counter C102 and increment it by one
1> If this is a reset request that is being re-transmitted
2> increment the counter C102 by one The transmitting RRC entity 222 sets the contents of the PROTOCOL RESET message 301 as follows:
0> If C102 counter is <=MaxNumberofResetReTransmissions+1
1> Identify the RLC entities to be reset in the PROTOCOL RESET REQUEST message 301 and set the Transaction Identifier in the message to be equal to the value of the C102 counter
0> else
1> Declare RL failure and start the RL failure handling procedure.
2> Try to re-establish the connection by sending the RRC re-establishment request Upon receiving a PROTOCOL RESET REQUEST message 301 the RRC entity 232:
1> Initiates transmission of the PROTOCOL RESET ACKNOWLEDGE message 302
1> Passes the reset request to the RLC entity 231
1> Starts timer T103 when lower layers indicate successful transmission of the message (optional)

The RRC entity 232 sets the contents of the PROTOCOL RESET ACKNOWLEDGE message 302 as follows:
1> Set the Transaction Identifier value of the message to the corresponding Transaction Identifier in the PROTOCOL RESET REQUEST message 301 being acknowledged Upon receiving a PROTOCOL RESET ACKNOWLEDGE 302, the RRC entity 222:
1> Stops timer T102
1> Resets counter C102 to zero
1> Initiates transmission of the PROTOCOL RESET COMPLETE message 303 (optional)
1> Indicate receipt of the acknowledgment to the lower layers (e.g. RLC)

The following is a summary of the messages depicted in FIG. 3.

The PROTOCOL RESET REQUEST message 301 is used for requesting a reset of a lower-layer protocol entity:
Signaling radio bearer: SRB 1 or SRB 2
RLC-SAP: AM or UM
Logical channel: DCCH
Direction: UE→E-UTRAN, EUTRAN→UE

| Name | Need | Type/reference |
| --- | --- | --- |
| Message Type | MP | <ref> |
| Transaction identifier | MP | Integer [0 . . . 3] |
| Protocol Reset Indicator IE | MP | |

The PROTOCOL RESET ACKNOWLEDGMENT message 302 is used for acknowledging a reset of a lower-layer protocol entity:
Signaling radio bearer: SRB 1 or SRB 2
RLC-SAP: AM or UM Logical channel: DCCH
Direction: UE→E-UTRAN, EUTRAN→UE

| Name | Need | Type/reference |
|---|---|---|
| Message Type | MP | <ref> |
| Transaction identifier | MP | Integer [0 . . . 3] |
| Protocol Reset Ack IE | MP | |

The PROTOCOL RESET COMPLETE message 303 is used for completing a reset of a lower-layer protocol entity (optional):
Signaling radio bearer: SRB 1 or SRB 2
RLC-SAP: AM or UM
Logical channel: DCCH
Direction: UE→E-UTRAN, EUTRAN→UE

| Name | Need | Type/reference |
|---|---|---|
| Message Type | MP | <ref> |
| Transaction identifier | MP | Integer [0 . . . 3] |

The disclosed methods and apparatuses are applicable to any wireless communication devices and systems, including those related to 3GPP LTE and/or HSPA enhancements (e.g. WCDMA evolution Rel-7, Rel-8, etc).

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented by a wireless transmit/receive unit (WTRU), comprising:
receiving a radio resource control message (RRC) connection reconfiguration message, and in response to receiving the RRC connection reconfiguration message:
reassembling radio link control (RLC) service data units (SDUs) from any protocol data units (PDUs) that are received out of sequence at a receiving side of a RLC entity;
discarding at the receiving side of the RLC entity any remaining PDUs that are not able to be reassembled;
discarding at a transmitting side of the RLC entity all SDUs and PDUs stored in transmit buffers;
stopping and resetting all timers associated with the RLC entity; and
resetting all state variables associated with the RLC entity to initial values.

2. The method according to claim 1, further comprising sending a RLC reset acknowledgment to the RRC entity.

3. The method according to claim 1, wherein the RLC entity operating type is acknowledgment mode.

4. A wireless transmit/receive unit (WTRU), comprising:
a processor comprising:
a radio resource control (RRC) entity configured to receive a RRC connection reconfiguration message; and
a radio link control (RLC) entity configured, in response to the RRC connection reconfiguration message, to reassemble RLC service data units (SDUs) from any protocol data units (PDUs) that are received out of sequence at a receiving side of the RLC entity; to discard at the receiving side of the RLC entity any remaining PDUs that are not able to be reassembled; to discard at a transmitting side of the RLC entity all SDUs and PDUs stored in transmit buffers; to stop and reset all timers associated with the RLC entity; and to reset all state variables associated with the RLC entity to initial values.

5. The WTRU according to claim 4, wherein the RRC entity is further configured to send a RLC reset acknowledgment to the RRC entity.

6. The WTRU according to claim 4, wherein the RRC entity is further configured to send a RLC reset acknowledgment to the RRC entity upon the RLC entity having completed a reset.

7. The WTRU according to claim 4, wherein the RLC entity operating type is acknowledgment mode.

* * * * *